United States Patent Office 3,586,535
Patented June 22, 1971

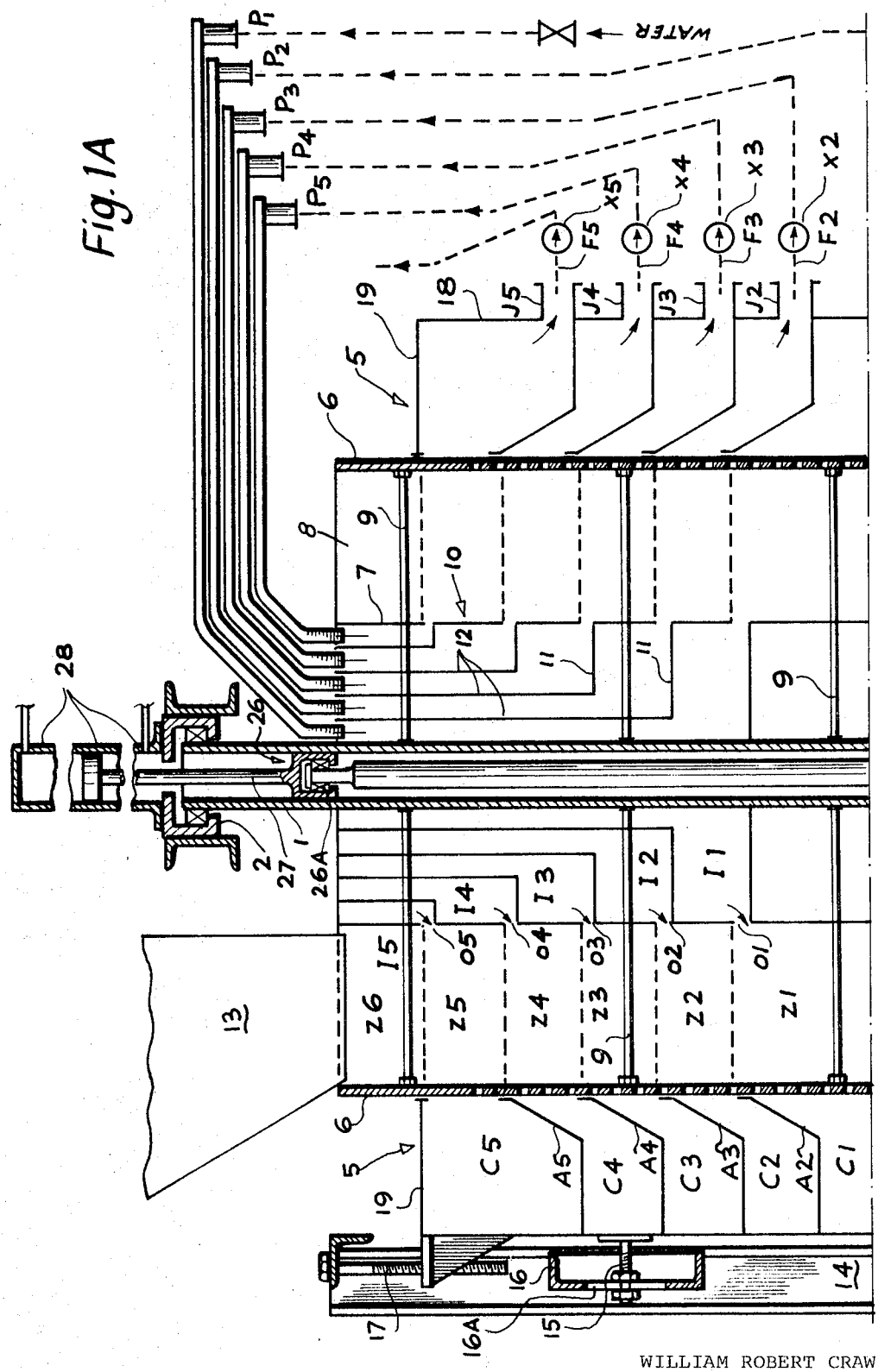

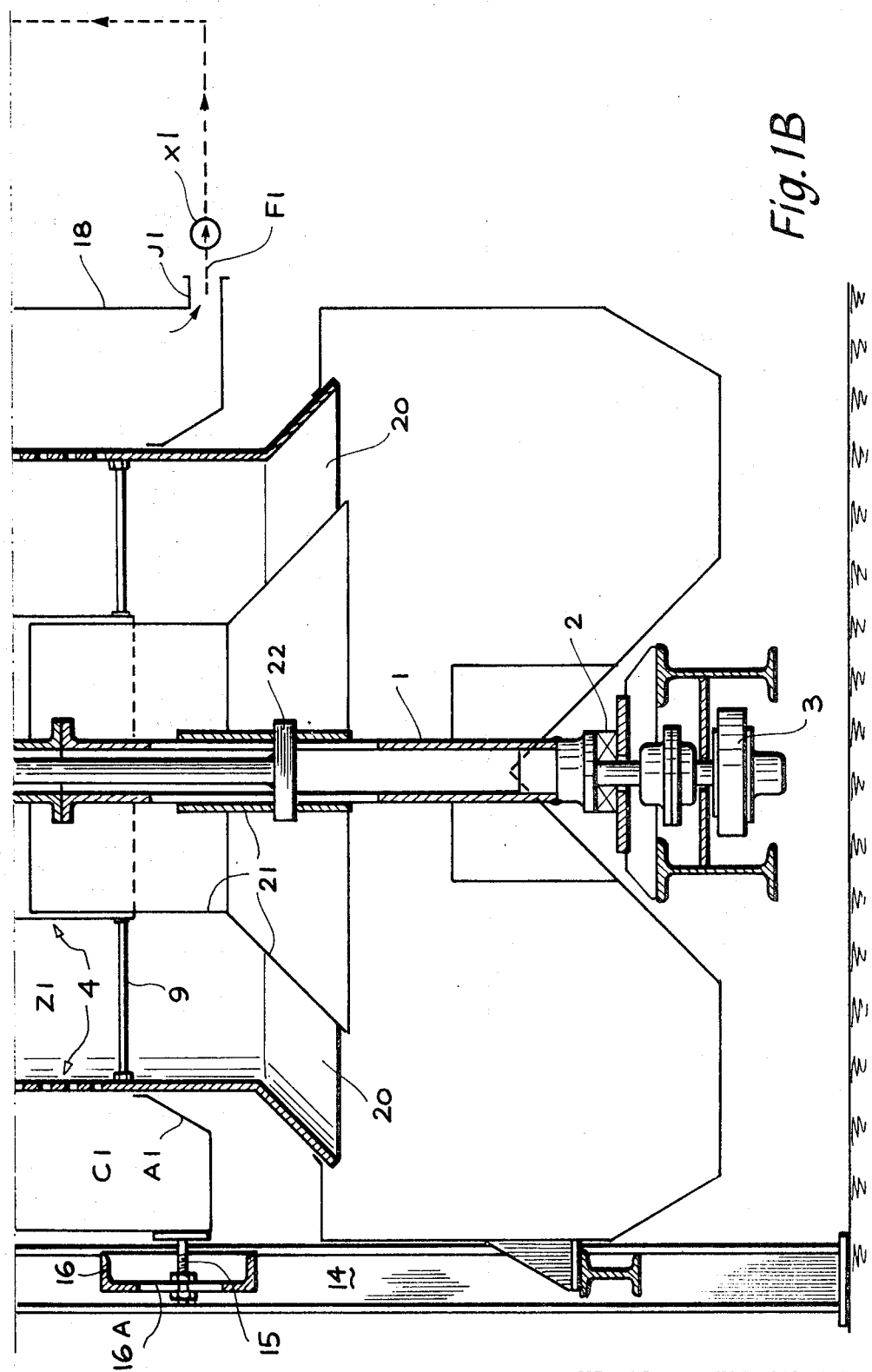

3,586,535
EXTRACTION OF SUGAR CANE AND BAGASSE
William Robert Crawford, Maryborough, Queensland, Australia, assignor to Walkers, Limited, Maryborough, Queensland, Australia
Filed Dec. 3, 1968, Ser. No. 780,725
Claims priority, application Australia, Dec. 20, 1967, 31,424/67
Int. Cl. C13d 1/12, 1/10; B01d 11/02
U.S. Cl. 127—7                                           10 Claims

ABSTRACT OF THE DISCLOSURE

Extraction of sugar juices from prepared (i.e., crushed) sugar cane or bagasse (sometimes known as "megass" or "megasse") by causing the cane or bagasse to gravitate downwardly through an annular space between two concentric walls spinning on vertical axis and introducing imbibition water into a zone adjacent the lower end of the annular column of spinning material. The water is passed through the column by centrifugal action, picking up sugar from that zone and is then collected and reintroduced into the column in the next upwardly adjacent zone. This continues until the water and collected juice is passed through the lower part of the highest zone, from which the liquor is collected and transferred for further treatment. The process is continuous, all zones being under simultaneous treatment with liquor of upwardly increasing degrees of sugar concentration.

---

This invention relates to improvements in the extraction of cane or bagasse by the process of lixiviation, a process which has commonly, but erroneously, been termed "diffusion."

Apparatus in which the process of lixiviation has previously been carried out have become known in the art as "diffusers" and accordingly, to prevent confusion, they are referred to by that term hereunder.

In all existing types of bed diffuser, a bed of prepared (i.e., "disintegrated") cane or bagasse, is formed and is moved slowly in a substantially horizontal plane. Imbibition water is applied near the tail (i.e., "leading") end of the moving bed and percolates therethrough, simultaneously washing out some of the juice from the prepared cane or bagasse. This juice is collected and applied to the bed a stage further back towards the trailing end of the moving bed, at a position where the juice in the bed is somewhat richer in sugar than the applied juice.

This process is continued in several stages, the juice being applied to the moving bed a stage nearer to the trailing end of the moving bed until the whole bed has been covered right up to its head, where the cane or bagasse is initially admitted to form the bed.

At this latter point, the percolating juice has its maximum sugar content, and from the final stage it is withdrawn and passed for further processing into sugar crystals.

It will be appreciated that this process is continuous throughout the horizontal length of the bed, one percolation in each stage being followed by a further percolation of the moving bed, to which further cane or bagasse has been moved.

The efficacy of such existing bed diffusers depends chiefly upon the ability of the imbibition water or recirculated lixiviating juice to percolate through the bed under gravity. The time required for each irrigation and drainage stage, and hence the total residence time, depends upon the permeability and thickness of the bed. Such beds have normal thicknesses of 5 to 6 feet and since the permeability of prepared cane or bagasse is low, the necessary residence time ranges from 25 to 45 minutes, depending upon the type of bed diffuser in use.

Existing bed diffusers are large and cumbersome and at a processing rate of, say, 300 tons cane/hour the bed would weigh in the region of 250 tons and cover a superficial area of around 1600 square feet.

If the residence time can significantly be reduced, then the size of the diffuser, and consequently its cost, can also be reduced.

The object of the present invention is to provide apparatus and a method whereby such economy in size and cost can be achieved.

According to one general form of the invention, apparatus for lixiviating prepared cane or bagasse in the extraction of juice therefrom includes two axially vertical cylindrical, conical or frusto-conical hollow bodies concentrically disposed co-extensively one within the other to define an annular space therebetween, means for rotating said bodies in unison about a vertical common axis, inlet means leading into the upper end of said annular space for continuously feeding prepared cane or bagasse thereinto while said bodies are rotating, outlet means at the base of said annular space permitting egress of said prepared cane or bagasse therefrom, irrigating means for supplying liquid to said annular space in successive zones progressively from adjacent the lower end thereof to adjacent the upper end thereof, stationary means for collecting juice emerging from each said successive zone, means for circulating said juice emerging from one zone to the respective next successive zone there-above and for circulating the juice emerging from the uppermost irrigated zone to apparatus for further treatment thereof.

Also according to a further general form of the invention, a process for the lixiviating of prepared cane or bagasse includes the steps of continuously feeding said prepared cane or bagasse into the upper zone of and downwardly through an annular space between two axially vertical concentric hollow cylinders, cones or frusto cones while they are rotating in unison about a common vertical axis, passing an irrigating liquid successively through upwardly succeeding zones of said prepared cane or bagasse in said annular space from the inner periphery to the outer periphery thereof while continuing said rotation, separately collecting the liquid emerging from the outer periphery of one zone and re-circulating it to and through the next upwardly-succeeding zone thereof and collecting the liquid emerging from the uppermost irrigated zone and diverting it for further treatment, the prepared can or bagasse gravitating downwards in said annular space continuously throughout said process.

But a better understanding of the invention may be obtained from the following description of one exemplary form thereof when this is read with reference to the accompanying diagrammatic drawing of a vertical section of one form of apparatus according thereto. It is to be appreciated, however, that the drawing and the description related thereto are by way of example, only, and that the full scope of the invention is intended to be limited only to the extent of the accompanying claims, wherein the invention is defined.

As shown in FIGS. 1A and 1B, a hollow vertical shaft 1 rotates in bearings 2 and is driven by a variable speed hydraulic motor 3.

A rotor 4 is mounted on and secured to the shaft 1 and rotates with it, the rotor 4 being enclosed within a stationary non-rotatable monitor casing 5.

The rotor 4 consists of an outer cylindrical wall 6, perforated over the greater part of its length, and a discontinuous inner wall 7. These walls 6 and 7 define an annular space 8.

The annular space 8 extends throughout the vertical depth of the walls 6 and 7 and is unobstructed except by a minimum of radial ribs or rods 9, necessary to hold the walls 6 and 7 together. As downward movement of the prepared cane or bagasse, as hereunder described, in the space 8 is by gravity, the smallest possible obstruction is essential, and thus the ribs or rods 9 are kept to a minimum both in dimensions and number.

The discontinuous inner wall 7 is formed by a series of units 10, each comprising a section of the inner wall 7, a flat annular plate 11 and a cylindrical wall 12.

The radial ribs or rods 9 which hold walls 6 and 7 together extend through, and are attached to, the units 10. The ribs or rods 9 are also attached to the hollow vertical shaft 1.

The vertical height of the space 8 is divided into imaginary zones Z1 to Z6, of which zone Z6 is a non-irrigated inlet zone, and Z1 is irrigated only in its upper portion and acts, in its lower portion, as a non-irrigated discharge zone. Thus, in the following description and claims "irrigated" zone does not include zone Z6.

The zones are imaginary to the extent that in the space 8 they are not defined by any physical partitions but attain their zonal effect in the operation of the apparatus, as will become clear hereafter. The broken lines at the left of the drawing are inserted merely for assistance in the description and are not intended to indicate any such physical partition.

The inner wall units 10 define irrigating chambers I1 to I5 which are separated by the respective concentric cylindrical walls 12. Annular openings O1 to O5 provide communication between the irrigating chambers I1 to I5 and the upper region of the respective zones Z1 to Z5.

The annular spaces formed between the hollow shaft 1, the cylindrical walls 12 of the irrigating chambers I1 to I5 and the upper part of the inner wall 7, extend to the top of the rotor 4 and are there open upwardly to atmosphere at that level.

Irrigating liquids are supplied to the irrigating chambers I1 to I5, through the abovementioned annular spaces, by the externally located pipes P1 to P5, respectively, one to each irrigating chamber I1 to I5, and each pipe depending slightly into its annular space, but not being connected to the rotor. 4.

Above the upper end of the space 8 is located a feed chute 13 which feeds prepared cane or bagasse tangentially into the zone Z6 as it moves thereunder during rotation of the rotor 4.

The annular cylindrical non-rotatable monitor casing 5 is secured to a number of external, circumferentially placed columns 14 by studs 15 attached to the monitor casing 5. The cross members 16 on the columns 14 are vertically slotted as at 16a so that the vertical position of the monitor casing 5 may be adjusted by a plurality of adjusting screws 17, and thereafter be locked in position. The reason for this is described hereunder.

The annular space between the outer wall of the monitor casing 5 and the outer wall 6 of the rotor 4 is divided vertically into five superimposed annular chambers C1 to C5, by annular troughs A1 to A5. The troughs are each formed with a substantially flat annular outer half connected at its outer edge to the wall 18 of the monitor casing 5, and an annularly inwardly upwardly directed portion which terminates as closely as possible to the outer perforated wall 6 of the rotor 4 but is not connected thereto. The inner edge of the annular top closure plate 19 of the monitor casing 5 also terminates as closely as possible to the rotor 4 and is similarly not connected thereto.

Juice outlets J1 to J5 from each anular trough A1 to A5 are provided in the wall 18 of the monitor casing 5. Each outlet J1 to J4 is connected by a flexible pipe F1 to F4 to a pump X1 to X4 which pass the juice to the pipes P2 to P5, respectively.

Movement of the prepared cane or bagasse downwardly in the annular space 8 progressively through the zones Z6 to Z1 is by gravity to the annular outlet 20, and in order to control this downward movement to give the material a sufficient residence time in the respective zones for adequate irrigation, means are provided adjacent to the outlet 20 whereby the residence time may be controlled.

This control may be effected by a vertically slidable frusto-conical-cylinder unit 21. This unit can slide relative to the hollow rotating shaft 1 but rotates with the hollow shaft 1 by virtue of the action of the cotter 22, which projects through slots 23 in the hollow shaft 1, to engage with the sleeve 24 of the vertically moveable unit 21. A rotating connecting rod 25 extending upwardly in the hollow shaft 1 engages at its lower end with the cotter 22, and carries at its upper end a bearing assembly 26 which terminates in a ball thrust bearing. The non-rotating upper race 26a of this thrust bearing engages with the non-rotating piston rod 27, of a hydraulic piston and cylinder assembly 28.

This arrangement, by projection or retraction of the piston rod 27 in the known manner, permits a variation in the area of the outlet 20 so allowing control of the residence time.

As previously described, the purpose of the apparatus is the same as that of the prior art bed diffusers, namely, to percolate water through a bed of prepared cane or bagasse to wash out some sugar juice therefrom, to collect the thin juice so obtained and to re-percolate it through a stage still further back (in this case the next upper zone) wehre the juice in the bed is somewhat richer in sugar than the re-percolated juice, and so on, stage by stage, or zone by zone, upwardly to the zone adjacent the inlet for the prepared cane or bagasse.

In the present invention (assuming the space 8 to be completely filled and the rotor 4 spinning with the apparatus fully operative) juice has already been passing through the respective zones Z1 to Z5, while zone Z6 is being kept filled with unpercolated prepared cane or bagasse from the inlet chute 13. It follows, therefore, that the material in zone Z5 has a richer sugar juice content than in zone Z1.

In operation, with the rotor 4 spinning, water is admitted to the irrigation chamber I1 from pipe P1. It passes through the annular opening O1 in chamber I1 into the material in zone Z1. It passes through this material by centrifugal action, picking up some sugar juice, and then through the perforations in the wall 6 into the annular trough A1, and thence through the connection J1 to the pump X1 which passes it to inlet pipe P2.

From pipe P2 it passes to chamber I2 and via opening O2 through zone Z2 (which has a higher sugar content than zone Z1) into trough A2 which it leaves by connection J2 to pump X2 which passes the juice (now richer in sugar juice that that emerging from zone Z1) to pipe P3.

The same sequence occurs in each successive upward zone Z3 to Z5, the juice becoming progressively richer as it passes through each upwardly succeeding zone. From zone Z5, through trough A5 and connection J5, the juice is taken away from the apparatus for further treatment as may be required, and for this purpose may be connected by a flexible pipe F5 with a pump X5.

Material leaving the outlet 20 is collected and taken to pressure rolls where a proportion of the remaining dilute juice is expressed and collected. This collected juice may be re-introduced to the irrigating system through the pipe P2.

The purpose of the adjusting means 15 to 17 is to enable the monitor casing 5 containing the juice collecting troughs A1 to A5 to be raised or lowered relative to the rotor 4, to bring the troughs A1 to A5 into the optimum position of efficiency relative to the zones Z1 to Z5.

When this position has been attained it may be held by the screws 17 and the studs 15, which latter are vertically slidable in the verticle slots 16a in the cross-members 16. This position may be adjusted as desired even when the rotor 4 is rotating.

By means of the present invention the cost and size of bed diffusers is very greatly reduced, because due to the positive centrifugal action of the rotor 4, residence time in the apparatus is much less than in conventional gravity bed diffusers.

Although five treatment zones are described hereabove, this number is not empirical, and the number of zones may be varied as circumstances dictate.

Furthermore, the rotor 4 and monitor casing 5 need not necessarily be cylindrical, but may be conical or frusto-conical.

What is claim is:

1. Apparatus for lixiviating prepared cane or bagasse in the extraction of juice therefrom, including two axially vertical hollow bodies having peripheral walls and being concentrically disposed co-extensively one within the other to define an annular space therebetween, the wall of the innermost of said hollow bodies being discontinuous vertically to define vertically spaced annular openings therearound, each of said annular openings defining irrigating means for a plurality of successive zones and providing communication between a correlated one of a plurality of irrigating chambers and the associated zone, each of said irrigating chambers being defined by a flat annular plate secured at its outer periphery to the lower edge of one of said annular openings and at its inner periphery to a vertical annular wall extending upwardly of said plate concentrically and upwardly co-extensively within the wall of said innermost hollow body, means for rotating said hollow bodies in unison about a vertical common axis, inlet means leading into the upper end of said annular space for continuously feeding prepared cane or bagasse thereinto while said bodies are rotating, outlet means at the base of said annular space permitting egress of said prepared cane or bagasse therefrom, irrigating means for supplying liquid to said annular space in successive zones constituting at least part of the aforesaid zones, progressively from adjacent the lower end of said annular space to adjacent the upper end thereof, said vertical annular walls helping to define said irrigating chambers further defining between them a plurality of annular liquid passages equal in number to said zones and being open to atmosphere at their upper ends, stationary means for collecting juice emerging from each of said successive zones, and means for circulating said juice emerging from the uppermost irrigated zone to apparatus for further treatment thereof.

2. Apparatus as defined in claim 1 wherein said hollow bodies are of generally cylindrical form.

3. Apparatus as defined in claim 1 wherein said hollow bodies are of generally conical form.

4. Apparatus as defined in claim 1 wherein said hollow bodies are of generally frusto-conical form.

5. Apparatus according to claim 1 wherein said vertical hollow bodies are secured to a rotatable vertical hollow shaft rotatable by a prime mover drivingly secured to the lower end thereof, and wherein the lower ends of said two concentric hollow bodies are outwardly flared to define said annular space for permitting egress of said prepared cane or bagasse, said vertical hollow shaft being connected to the flared portion of the innermost hollow body which is telescopically slidable on said innermost hollow body, whereby said telescopically slidable portion of said inermost hollow body may be adjusted in position to vary the outlet area of the said annular space.

6. Apparatus according to claim 5, wherein the means to adjust said telescoipcally slidable portion of said innermost hollow body include a rod located concentrically within said hollow shaft and connected to a lower portion thereof, said rod being connected to the piston rod of a fluid pressure piston and cylinder device operable to raise or lower said rod within said hollow shaft.

7. Apparatus according to claim 1, including a liquid inlet pipe directed into the upper end of each said annular liquid passage, the wall of the outermost said hollow body being perforated from the lower portion of the second uppermost of said zones downwardly to a point adjacent the lower portion of the lowermost of said zones.

8. Apparatus according to claim 7, wherein said stationary means comprises an annular body fixedly secured around the outermost of said rotating hollow bodies and being divided vertically into a plurality of superimposed annular chambers each open to the wall of said outermost hollow body and corresponding in number to said zones, a liquid outlet from each said annular chamber, each of said liquid outlets being connected to one of said inlet pipes in such manner that the outlet from all but the uppermost irrigated zone is connected to the inlet pipe to the next successive higher zone, the inlet pipe to the lowermost zone being connected to a water supply source and the outlet from the uppermost irrigated zone being connected to a pipe for conducting the liquid passing therethrough away for further treatment.

9. Apparatus according to claim 8, including a flexible pipe and pumping means connected in series with each of said outlets.

10. Apparatus according to claim 8, wherein said stationary means is vertically adjustable to move said superimposed annular chambers into the desired position relative to said zones.

References Cited
UNITED STATES PATENTS

| | | | |
|---|---|---|---|
| 402,056 | 4/1889 | Bianchi | 127—4 |
| 1,689,490 | 10/1928 | Kelsey | 210—376 |
| 2,036,924 | 4/1936 | Coutor | 23—269X |
| 2,646,172 | 7/1953 | Cox et al. | 210—215 |
| 2,734,635 | 2/1956 | Holzenthal | 23—269X |
| 3,453,083 | 7/1969 | Beerli | 23—269 |

MORRIS O. WOLK, Primary Examiner

D. G. CONLINS, Assistant Examiner

U.S. Cl. X.R.

23—269; 127—5, 43, 45; 210—215, 378